United States Patent
Usui et al.

(10) Patent No.: US 10,708,174 B2
(45) Date of Patent: Jul. 7, 2020

(54) COMMUNICATION SYSTEM, TRANSMITTER, RECEIVER, COMMUNICATION METHOD, TRANSMISSION METHOD, AND RECEPTION METHOD

(71) Applicant: PANASONIC INTELLECTUAL PROPERTY MANAGEMENT CO., LTD., Osaka (JP)

(72) Inventors: Takeru Usui, Kanagawa (JP); Kunihiko Sakaibara, Kanagawa (JP)

(73) Assignee: PANASONIC INTELLECTUAL PROERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/761,632

(22) PCT Filed: Sep. 5, 2016

(86) PCT No.: PCT/JP2016/004033
§ 371 (c)(1),
(2) Date: Mar. 20, 2018

(87) PCT Pub. No.: WO2017/056398
PCT Pub. Date: Apr. 6, 2017

(65) Prior Publication Data
US 2018/0351853 A1 Dec. 6, 2018

(30) Foreign Application Priority Data
Sep. 30, 2015 (JP) .................. 2015-193904

(51) Int. Cl.
*H04L 12/707* (2013.01)
*H04L 29/06* (2006.01)
(Continued)

(52) U.S. Cl.
CPC .......... *H04L 45/24* (2013.01); *H04L 63/0428* (2013.01); *H04L 63/18* (2013.01);
(Continued)

(58) Field of Classification Search
CPC ...................................................... H04L 45/24
See application file for complete search history.

(56) References Cited

U.S. PATENT DOCUMENTS

| 5,757,922 A | 5/1998 | Shiroshita |
| 2002/0154631 A1* | 10/2002 | Makansi ............ H04L 63/0428 370/389 |

(Continued)

FOREIGN PATENT DOCUMENTS

| JP | 62-214744 | 9/1987 |
| JP | 09-321750 | 12/1997 |

OTHER PUBLICATIONS

Ford et al., "TCP Extensions for Multipath Operation with Multiple Addresses", Internet Engineering Task Force (IETF, Request for Comments: 6824, ISSN: 2070-1721 (Jan. 2013).
(Continued)

*Primary Examiner* — Kodzovi Acolatse
*Assistant Examiner* — Abdeltif Ajid
(74) *Attorney, Agent, or Firm* — Greenblum & Bernstein, P.L.C.

(57) ABSTRACT

In order to ensure security even when packet communication is performed using a plurality of communication paths of a public network, a transmitter stores a first communication pattern. First and second communication units perform packet communication with third and fourth communication units. The packet communication is performed in accordance with the first communication pattern, with dummy packets being inserted into at least one of the groups of packets to be transmitted. A processor restores original data from valid packets, which are remaining packets after the dummy packets are removed, in accordance with a second communication pattern.

18 Claims, 5 Drawing Sheets

(51) Int. Cl.
  *H04W 12/00*    (2009.01)
  *H04W 76/15*    (2018.01)
  *H04L 12/801*   (2013.01)

(52) U.S. Cl.
  CPC .............. *H04L 69/14* (2013.01); *H04L 69/16* (2013.01); *H04W 12/001* (2019.01); *H04W 76/15* (2018.02); *H04L 47/193* (2013.01); *H04L 47/34* (2013.01)

(56) References Cited

U.S. PATENT DOCUMENTS

| | | | | |
|---|---|---|---|---|
| 2002/0181439 | A1* | 12/2002 | Orihashi | H04J 3/0605 370/350 |
| 2005/0201162 | A1* | 9/2005 | Shibata | H03M 9/00 365/189.05 |
| 2008/0267190 | A1* | 10/2008 | Baker | H04L 1/0083 370/394 |
| 2010/0085980 | A1* | 4/2010 | Hinosugi | H04L 47/10 370/412 |
| 2010/0278517 | A1 | 11/2010 | Sakata et al. | |
| 2011/0103291 | A1* | 5/2011 | Wiberg | H04B 7/15542 370/315 |
| 2013/0205153 | A1* | 8/2013 | Yokoyama | G06F 1/3275 713/323 |
| 2015/0188662 | A1* | 7/2015 | Shapira | H04K 3/62 455/1 |
| 2018/0254979 | A1* | 9/2018 | Scahill | H04L 45/24 |

OTHER PUBLICATIONS

International Search Report (ISR) from International Searching Authority (Japan Patent Office) in International Pat. Appl. No. PCT/JP2016/004033, dated Nov. 22, 2016.

* cited by examiner

COMMUNICATION SYSTEM, TRANSMITTER, RECEIVER, COMMUNICATION METHOD, TRANSMISSION METHOD, AND RECEPTION METHOD

TECHNICAL FIELD

The present disclosure relates to a communication system, a transmitter, a receiver, a communication method, a transmission method, and a reception method, for transmitting necessary information in a communication network.

BACKGROUND ART

In recent years, a technique related to a Multipath TCP (MPTCP) which performs transmission of a packet using a plurality of communication paths in a communication network is being developed (refer to NPL 1). According to the MPTCP, there are advantages such as improvement of transmission rate or improvement in stability of communication for using a plurality of TCP connections (communication paths) with respect to one session.

In the related art, as a communication method for improving security in a packet communication between a transmitter side and a receiver side which are connected with each other through a communication network, for example, a technique in which after original data is divided into to be stored a data unit in a packet, and the packet is assembled by giving a pseudo packet identifier for indicating a scrambled packet sequence to the packet, and then the packet is transmitted through a network in the scrambled packet sequence based on the pseudo packet identifier is known (refer to PTL 1).

CITATION LIST

Non-Patent Literature

NPL 1: RFC 6824 (IETF), "TCP Extensions for Multipath Operation with Multiple Addresses" (A. Ford et al.)

PATENT LITERATURE

PTL 1: Japanese Patent Unexamined Publication No. H09-321750

SUMMARY OF THE INVENTION

An object of the present disclosure is to provide a communication system, a transmitter, a receiver, a communication method, a transmission method, and a reception method capable of securing security by a simple configuration, in a case where a packet communication is performed by using a plurality of communication paths by a communication network.

According to the present disclosure, there is provided a communication system including a transmitter and a receiver which perform communication with each other. The transmitter includes a first storage unit that stores information on a first communication pattern, first and second communication units that perform packet communication with the receiver through paths different from each other, and a first processor that controls the packet communication by the first and second communication units. The receiver includes a second storage unit that stores information on a second communication pattern corresponding to the first communication pattern, third and fourth communication units that are provided to correspond to the first and second communication units and perform the packet communication with the transmitter, respectively, and a second processor that controls the packet communication by the third and fourth communication units. The first processor transmits a packet to the receiver by the first communication unit or the second communication unit which is selected for each packet according to the first communication pattern, and inserts a dummy packet which does not include valid data into at least a part of packet groups transmitted from each of the first communication unit and the second communication unit. The second processor restores original data from a valid packet by removing the dummy packet from the packets received from the transmitter by the third and fourth communication units, according to the second communication pattern.

According to the present disclosure, for example, even in a case where packet communication is performed by using a network of which security is required to be secured such as a public network, it is possible to secure security by a simple configuration.

DESCRIPTION OF EMBODIMENT

Figure 1:
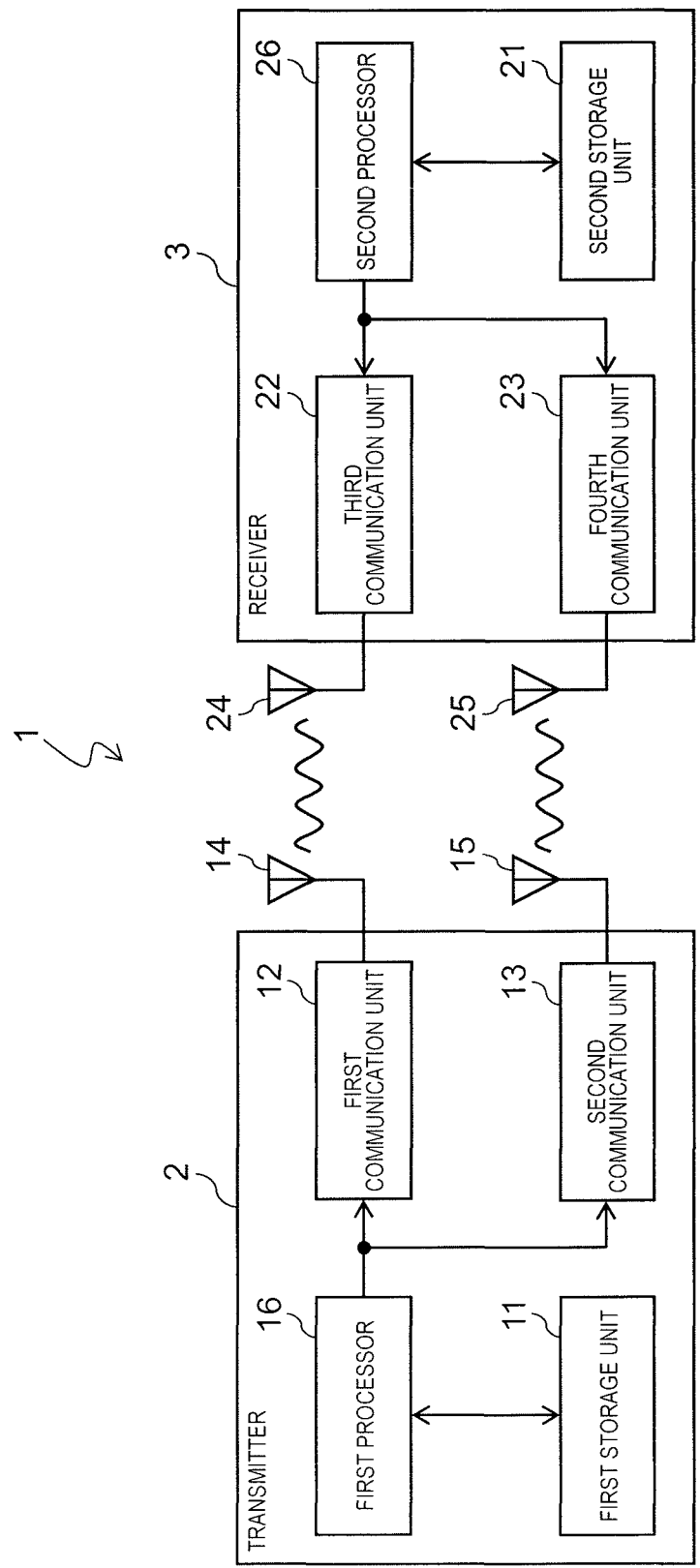
FIG. 1 is a block diagram illustrating a schematic configuration of a communication system according to the present disclosure.

According to a first disclosure for resolving the above problems, there is provided a communication system including a transmitter and a receiver which perform communication with each other. The transmitter includes a first storage unit that stores information on a first communication pattern, first and second communication units that perform packet communication with the receiver through communication paths different from each other, and a first processor that controls the packet communication by the first and second communication units. The receiver includes a second storage unit that stores information on a second communication pattern corresponding to the first communication pattern, third and fourth communication units that are provided to correspond to the first and second communication units and perform the packet communication with the transmitter, respectively, and a second processor that controls the packet communication by the third and fourth communication units. The first processor transmits a packet to the receiver by the first communication unit or the second communication unit which is selected for each packet according to the first communication pattern, and inserts a dummy packet which does not include valid data into at least a part of packet groups transmitted from each of the first communication unit and the second communication unit. The second processor restores original data from a valid packet by removing the dummy packet from the packets received from the transmitter by the third and fourth communication units, according to the second communication pattern.

With the communication system according to the first disclosure, in a case where the packet communication is performed by using a plurality of communication paths (a path by the first communication unit and the third communication unit, and a path by the second communication unit and the fourth communication unit) in a communication network, it is possible to secure security by a simple configuration in which the insertion of the dummy packet is performed.

According to a second disclosure, the first processor transmits the valid packet from one of the first and second communication units selected according to the first communication pattern, and transmits the dummy packet corresponding to the valid packet from the other of the first and second communication units, in the first disclosure.

With the communication system according to the second disclosure, the receiver acquires information on a pattern in which the valid packet is selectively transmitted by the first and second communication units (flow of the packets) of the transmitter as the second communication pattern. Therefore, it is not necessary to determine effectivity of each packet and it is possible to secure security by a simpler configuration.

According to a third disclosure, the first processor sets the information on the first communication pattern stored in the first storage unit based on negotiation performed between the first processor and the receiver, and the second processor sets the information on the second communication pattern stored in the second storage unit based on the negotiation, in the first disclosure.

With the communication system according to the third disclosure, the first communication pattern and the second communication pattern corresponding to the first communication pattern are set by the negotiation. Therefore, it is possible to secure higher security.

According to a fourth disclosure, the dummy packet includes random data instead of data included in the valid packet, in the first disclosure.

With the communication system according to the fourth disclosure, even in a case where the packet transmitted by the transmitter is received (intercepted) by an external device (third party), it is more difficult to determine the dummy packet. Therefore, it is possible to secure higher security.

According to a fifth disclosure, the transmitter is able to perform a normal mode in which the dummy packet is not inserted into the packets and a secure communication mode in which the dummy packet is inserted into the packets, and the first processor performs the secure communication mode only in a case where the amount of data transmitted to the receiver is less than a predetermined threshold value, in the first disclosure.

With the communication system according to the fifth disclosure, in a case where the amount of the transmitted data is large (the amount of the transmitted data is equal to or greater than the predetermined threshold value), the normal mode in which the insertion of the dummy packet is not performed is performed. Therefore, it is possible to reduce communication load.

According to a sixth disclosure, the first processor transmits the packets to the receiver by the first communication unit or the second communication unit which is selected for each packet according to the first communication pattern, and inserts the dummy packet which does not include the valid data into at least one side of the packet groups transmitted from each of the first communication unit and the second communication unit, in the first disclosure.

With the communication system according to the sixth disclosure, it is possible to secure security by a simple configuration in which the dummy packet is inserted into at least one side of the packet groups transmitted from each of the first communication unit and the second communication unit.

According to a seventh disclosure, there is provided a transmitter performing communication with a receiver. The transmitter includes a first storage unit that stores information on a first communication pattern, first and second communication units that perform packet communication with the receiver through paths different from each other, and a first processor that controls the packet communication by the first and second communication units. The first processor transmits a packet to the receiver by the first communication unit or the second communication unit which is selected for each packet according to the first communication pattern, and inserts a dummy packet which does not include valid data into at least a part of packet groups transmitted from each of the first communication unit and the second communication unit.

With the transmitter according to the seventh disclosure, in a case where the packet communication is performed by using a plurality of communication paths (a path by the first communication unit and a path by the second communication unit) in a communication network, it is possible to secure security by a simple configuration in which the insertion of the dummy packet is performed.

According to an eighth disclosure, there is provided a receiver performing communication with a transmitter. The receiver includes a second storage unit that stores information on a second communication pattern, third and fourth communication units that are provided to respectively correspond to two communication units that perform communication through paths which are provided in the transmitter and are different from each other so as to perform packet communication with the transmitter, and to perform the packet communication with the transmitter, respectively, and a second processor that controls the packet communication by the third and fourth communication units. A packet is transmitted by any one of the two communication units selected for each packet from the transmitter, and a dummy packet which does not include valid data is inserted into at least a part of packet groups which are transmitted from each of the two communication units. The second processor restores original data from a valid packet by removing the dummy packet from the packets received from the transmitter by the third and fourth communication units, according to the second communication pattern.

With the receiver according to the eighth disclosure, in a case where the packet communication is performed by using a plurality of communication paths (a path by the third communication unit and a path by the fourth communication unit) in a communication network, it is possible to secure security by a simple configuration in which the insertion of the dummy packet is performed.

According to a ninth disclosure, there is provided a communication method by a communication system including a transmitter and a receiver which perform communication with each other. The method includes a transmission step of transmitting a plurality of packets to the receiver through a communication path selected for each packet among a plurality of communication paths different from one another, by the transmitter, a dummy packet insertion step of inserting a dummy packet which does not include valid data into at least a part of packet groups transmitted through each of the plurality of communication paths, in the transmission step, and a data restoration step of restoring original data from a valid packet by removing the dummy packet from the packets received from the transmitter, by the receiver.

With the communication method according to the ninth disclosure, in a case where the packet communication is performed by using the plurality of communication paths in a communication network, it is possible to secure security by a simple configuration in which the insertion of the dummy packet is performed.

According to a tenth disclosure, there is provided a transmission method by a transmitter performing communication with a receiver. The transmission method includes a transmission step of transmitting a plurality of packets to the receiver through a communication path selected for each packet among a plurality of communication paths different from one another, and a dummy packet insertion step of inserting a dummy packet which does not include valid data into at least a part of the packets transmitted through each of the plurality of communication paths, in the transmission step.

With the transmission method according to the tenth disclosure, in a case where the packet communication is performed by using the plurality of communication paths in a communication network, it is possible to secure security by a simple configuration in which the insertion of the dummy packet is performed.

According to an eleventh disclosure, there is provided a reception method by a receiver performing communication with a transmitter. A plurality of packets are transmitted from the transmitter based on any one of communication paths selected for each packet among a plurality of communication paths different from one another, and a dummy packet which does not include valid data is inserted into at least one side of packet groups transmitted based on the selected communication path. The reception method includes a data restoration step of restoring original data from a valid packet by removing the dummy packet from the packets received from the transmitter, by the receiver.

With the reception method according to the eleventh disclosure, in a case where the packet communication is performed by using the plurality of communication paths in a communication network, it is possible to secure security by a simple configuration in which the insertion of the dummy packet is performed.

Hereinafter, an exemplary embodiment of the present disclosure will be described with reference to drawings.

FIG. 1 is a block diagram illustrating a schematic configuration of communication system 1 according to an exemplary embodiment of the present disclosure. Communication system 1 includes transmitter 2 and receiver 3 which perform communication with each other by using a plurality of communication paths simultaneously in a communication network (in particular, public network). Here, an example in which transmitter 2 and receiver 3 perform packet communication with each other by using the plurality of communication paths, based on a Multipath TCP (MPTCP) which is expanded from a Transmission Control Protocol (TCP).

Transmitter 2 includes first storage unit 11 that stores various pieces of information necessary to communicate with receiver 3, first communication unit 12 and second communication unit 13 that perform packet communication with receiver 3 based on communication methods different from each other, respectively, antennas 14 and 15 for wireless communication connected to first communication unit 12 and second communication unit 13, respectively, and first processor 16 that comprehensively controls various operations of transmitter 2 including the packet communication by such first communication unit 12 and second communication unit 13. In the present exemplary embodiment, first communication unit 12 and second communication unit 13 perform the packet communication based on communication methods different from each other, but first communication unit 12 and second communication unit 13 may perform the packet communication based on the same communication method. The main point is that as long as first communication unit 12 and second communication unit 13 perform communication through paths different from each other, any communication units may be used.

First storage unit 11 has a known nonvolatile memory, and stores a first communication pattern related to the packet communication by a secure communication mode between the first storage unit and receiver 3, which will be described later in detail. The first communication pattern is for realizing a security function of communication in communication system 1, and is concealed from anyone other than a user of communication system 1 (transmitter 2).

First communication unit 12 includes a communication module that is able to perform communication complying with a known communication method (here, Long Term Evolution (LTE) standard). In addition, second communication unit 13 includes a communication module that is able to perform communication complying with a known communication method (here, wireless LAN standard) different from that of first communication unit 12. Transmitter 2 is able to transmit a packet using (here, establishing a plurality of TCP connections by the LTE and the wireless LAN) the plurality of communication paths with respect to one session, by first communication unit 12 and second communication unit 13 of which the communication methods are different from each other.

Antenna 14 includes a known configuration corresponding to the communication method in first communication unit 12, and for example, is a known antenna using a Multi-Input Multi-Output (MIMO) technique. Similarly, antenna 15 includes a known configuration corresponding to the communication method in second communication unit 13. As described above, as long as first communication unit 12 and second communication unit 13 are able to use the plurality of communication paths, the configuration of each of antenna 14 and antenna 15 is not limited thereto. For example, the MIMO technique may not be used, and the configuration may use one antenna which uses a Single Input Single Output (SISO) technique.

First processor 16 controls the packet communication by first and second communication units 12 and 13 based on a predetermined communication control program. Although not illustrated in drawings, a volatile memory which functions as a work area and the like of a processor, a nonvolatile memory which stores communication control program or data performed by the processor, or the like is provided in the vicinity of first processor 16.

As described later, in association with the transmission of the packets, first processor 16 is able to selectively perform a plurality of operation modes including a normal mode in which the priority of a communication rate is above security and a secure communication mode in which the priority of the security is above the communication rate. In each of the operation modes, the packet communication using the plurality of paths based on the MPTCP is performed. By running the communication control program, first processor 16 stores data fragment generated by dividing the various pieces of data (hereinafter, referred to as "original data") which is transmitted to receiver 3 in the packet, selects one communication path (that is, first communication unit 12 or second communication unit 13) among the plurality of communication paths different from one another according to each of the packets, and transmits each of the packets to receiver 3 through selected first communication unit 12 or second communication unit 13.

Receiver 3 includes second storage unit 21 that stores various pieces of information necessary to communicate with transmitter 2, third communication unit 22 and fourth communication unit 23 that perform packet communication with transmitter 2 based on communication methods different from each other, respectively, antennas 24 and 25 for wireless communication connected to third communication unit 22 and fourth communication unit 23, respectively, and second processor 26 that comprehensively controls various operations of receiver 3 including the packet communication by such third communication unit 22 and fourth communication unit 23. In the present exemplary embodiment, third communication unit 22 and fourth communication unit 23 perform the packet communication based on communication methods different from each other, but third communication unit 22 and fourth communication unit 23 may perform the packet communication based on the same communication method. The main point is that as long as third communication unit 22 and fourth communication unit 23 perform communication through paths different from each other, it is good.

Second storage unit 21 has a known nonvolatile memory similarly to first storage unit 11, and stores a second communication pattern related to the packet communication between transmitter 2 and the second storage unit, which will be described later in detail. The second communication pattern is a pattern forming a pair with the above described first communication pattern, and is concealed from a person other than a user of communication system 1 (receiver 3).

Third communication unit 22 includes a communication module that is able to perform communication complying with the same communication method as that of first communication unit 12. In addition, fourth communication unit 23 includes a communication module that is able to perform communication complying with a communication method which is different from that of the third communication unit 22 and is the same as that of the second communication unit 13. Receiver 3 is able to transmit the packets using the plurality of communication paths simultaneously, according to a demand of transmitter 2.

Antenna 24 includes a known configuration corresponding to the communication method in third communication unit 22, similarly to the above described antenna 14. Antenna 25 includes a known configuration corresponding to the communication method in fourth communication unit 23, similarly to the above described antenna 15. As described above, as long as third communication unit 22 and fourth communication unit 23 are able to use the plurality of communication paths, the configuration of each of antenna 24 and antenna 25 is not limited thereto. For example, the MIMO technique may not be used, and the configuration may use one antenna which uses a Single Input Single Output (SISO) technique.

Second processor 26 has a configuration the same as that of first processor 16, and controls the packet communication by third and fourth communication units 22 and 23 based on a predetermined communication control program. In association with the transmission of the packets, second processor 26 is able to selectively perform a normal mode and a secure communication mode corresponding to the normal mode and the secure communication mode of the above described transmitter 2, respectively, according to a demand of transmitter 2.

In the present exemplary embodiment, for convenience of description, transmitter 2 (transmission side of the packets) and receiver 3 (reception side of the packets) are described. However, a configuration in which transmitter 2 functions as receiver 3 and receiver 3 functions as transmitter 2 is also possible. Known configurations such as a touch panel, a microphone, and a speaker may be provided in transmitter 2 and receiver 3.

Figure 2:
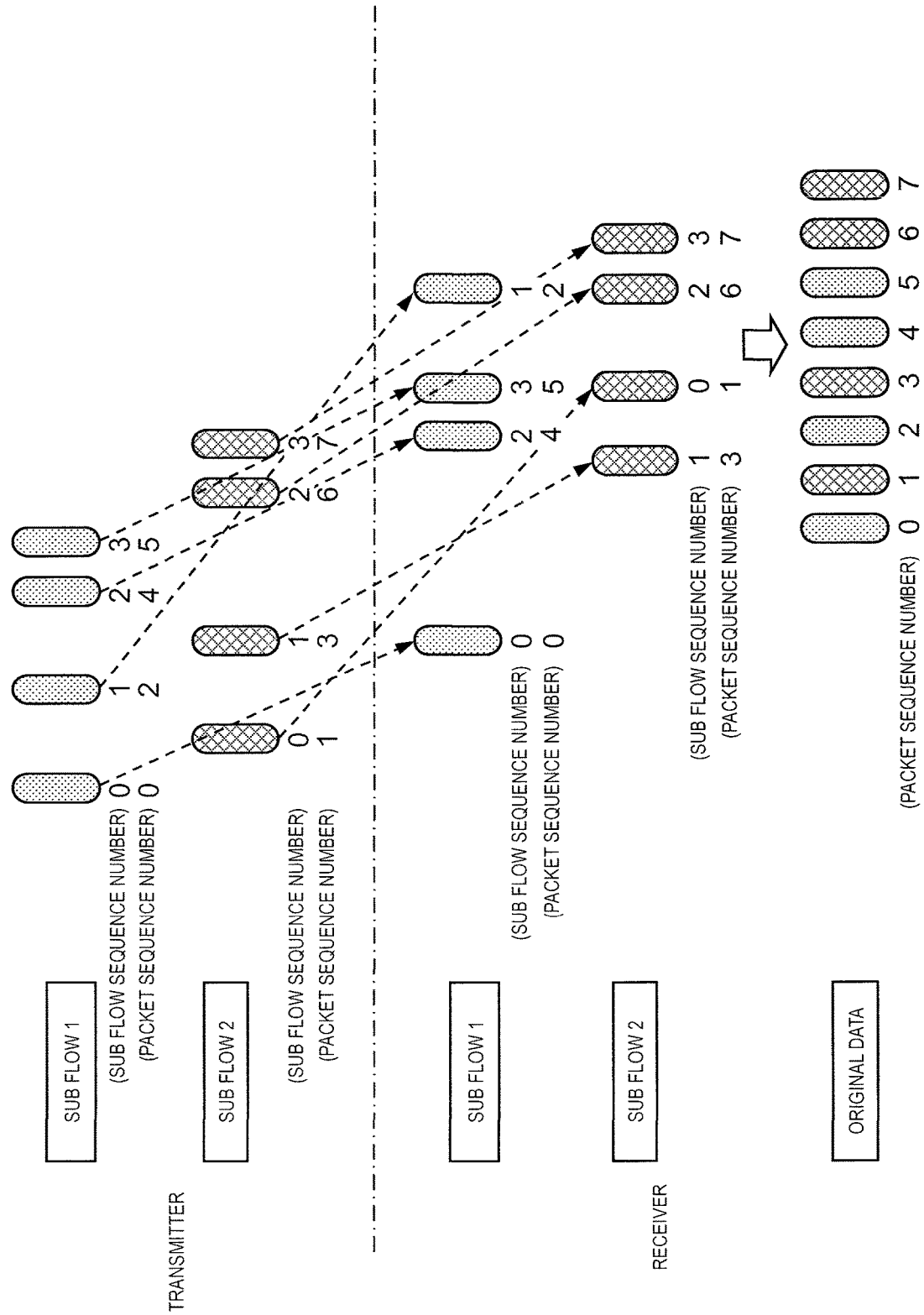
FIG. 2 is a diagram illustrating an outline of a packet communication method by a normal mode of the communication system.

FIG. 2 is a diagram illustrating an outline of a packet communication method by the normal mode of communication system 1. As shown in the upper portion of FIG. 2, a packet flow (hereinafter, referred to as "sub flow 1") in which the packet is transmitted by first communication unit 12 (LTE) and a packet flow (hereinafter, referred to as "sub flow 2") in which the packet is transmitted by second communication unit 13 (wireless LAN) are used in the packet communication by transmitter 2 in the normal mode. Each packet includes information on a sequence number (hereinafter, referred to as "sub flow sequence number") which is set for each sub flow (that is, for each communication method), and information on a sequence number (hereinafter, referred to as "packet sequence number") which is set for the entire packet of the same session regardless of the sub flow 1 and the sub flow 2. A packet group transmitted in the normal mode is formed of packets of which all are valid (that is, at least original data or packet including information useful in the transmission).

In FIG. 2, a time elapse is shown from the left to the right of the drawing, a first packet (packet sequence number 0) is transmitted as a packet (sub flow sequence number 0) of the sub flow 1 from first communication unit 12, and a second packet (packet sequence number 1) is transmitted as a packet (sub flow sequence number 0) of the sub flow 2 from second communication unit 13. Similarly, with respect to the subsequent packets (packet sequence numbers 2 to 7), the sub flow 1 or the sub flow 2 is also selected, and each of the subsequent packets are sequentially transmitted to receiver 3 from first communication unit 12 or second communication unit 13.

In the reception of the packets by receiver 3 in the normal mode, as shown in the lower portion of FIG. 2, the packets of the sub flow 1 are sequentially received by third communication unit 22, and the packets of the sub flow 2 are sequentially received by fourth communication unit 23. In receiver 3, the packets received by third communication unit 22 and fourth communication unit 23 are arranged in a correct sequence (here, ascending order of number) according to the packet sequence numbers 0 to 7. The arranged packets are processed by a predetermined application software which is executed by receiver 3, and are restored as the original data.

Figure 3:
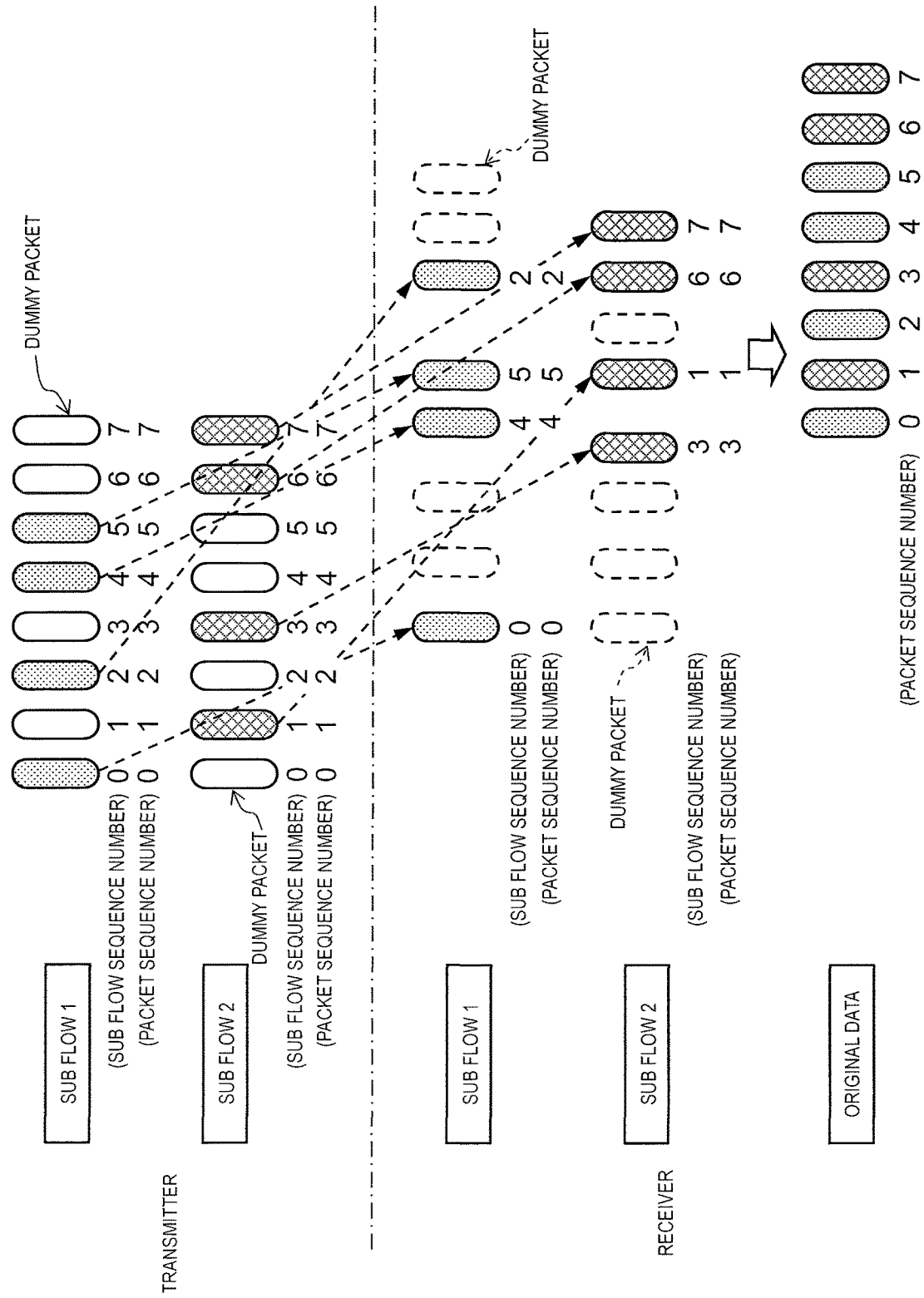
FIG. 3 is a diagram illustrating an outline of a packet communication method by a secure communication mode of the communication system.

FIG. 3 is a diagram illustrating an outline of a packet communication method by the secure communication mode of communication system 1. As shown in the upper portion of FIG. 3, in the packet communication by transmitter 2 in the secure communication mode, similarly to the normal mode shown in FIG. 2, the packets are sequentially transmitted by the sub flow 1 and the sub flow 2.

On the other hand, the point that a transmission path (communication path) is selected according to the first communication pattern which is stored in first storage unit 11 in the secure communication mode is different from that of a case of the normal mode in which a process of a normal MPTCP is performed. The transmission of the packets by the secure communication mode is different from that of a case of the normal mode. A dummy packet which does not include useful information is inserted between the valid packets in a predetermined timing, in the packets which are transmitted from each of first communication unit 12 and second communication unit 13, according to the above described first communication pattern.

In the present exemplary embodiment, in a case where a valid packet to which a predetermined packet sequence number is given is transmitted from one side of the sub flow 1 and the sub flow 2, a dummy packet to which the same packet sequence number as that of the valid packet is given is transmitted from the other side. Here, the first communication pattern includes information on a sub flow for transmitting the valid packet (or, the dummy packet) with respect to each of the sequentially transmitted packets (here, the information expressing the sub flow for transmitting the valid packet (or, the dummy packet)). For example, the first communication pattern may be expressed by using a predetermined table form, or may be expressed by using a predetermined algorithm.

The method of inserting the dummy packet is not limited to the method disclosed in the present exemplary embodiment. The dummy packet may also be inserted into at least a part of the packet groups transmitted by each of the sub flow 1 and the sub flow 2. As illustrated in the present exemplary embodiment, according to the configuration in which the dummy packet is inserted into at least one side of the packet groups transmitted by each of the sub flow 1 and the sub flow 2 (in a relationship in which the valid packet must be set in one side and the dummy packet must be set in the other side with respect to certain sub flow sequence numbers (or certain packet sequence numbers)), it is more preferable in the fact that an original data generation process according to the existing TCP protocol after a process of removing the dummy packet which is described later may be useful.

In FIG. 3, a time elapse is shown from the left to the right of the drawing similarly to FIG. 2, a first packet (packet sequence number 0 and sub flow sequence number 0) in the sub flow 1 is transmitted as the valid packet from first communication unit 12, and a first packet (packet sequence number 0 and sub flow sequence number 0) in the sub flow 2 is transmitted as the dummy packet from second communication unit 13, approximately simultaneously. Then, in the sub flow 1, the valid packets or the dummy packets to which the packet sequence numbers 2 to 7 and sub flow sequence numbers 2 to 7 are given respectively are sequentially transmitted. Similarly, in the sub flow 2, the dummy packets or the valid packets to which the packet sequence numbers 2 to 7 and the sub flow sequence numbers 2 to 7 are given are sequentially transmitted, so that types of the dummy packets or the valid packets are opposed to those of the packets of the sub flow 1. A data part of the dummy packet includes invalid data (here, random data).

In the reception of the packets by receiver 3 in the secure communication mode, similarly to the case of the normal mode, the packet of the sub flow 1 is received by third communication unit 22, and the packet of the sub flow 2 is received by fourth communication unit 23.

On the other hand, the secure communication mode is different from the normal mode in the point that the dummy packets (indicated by a broken line in the lower portion of FIG. 3) are discarded according to the second communication pattern which is stored in second storage unit 21 and only the valid packets are extracted, in the packet groups of the sub flow 1 and the sub flow 2. Here, the second communication pattern includes a pattern (here, an instruction indicating the determination of a sub flow for receiving the valid packet (or the dummy packet)) indicating the sub flow for receiving the valid packet (or, the dummy packet) with respect to each of the packets which are sequentially received.

Then, in receiver 3, the extracted valid packets are arranged in a correct sequence (here, ascending order of number) according to the packet sequence numbers. At this time, as the present exemplary embodiment, in a case where the dummy packet is inserted into at least one side of the packet groups transmitted by the sub flow 1 and the sub flow 2, it is possible to arrange the packets uniquely based on the packet sequence (or sub flow sequence) number after the dummy packet is discarded. Therefore, it is possible to use a process of generating original data used in the existing TCP protocol. The arranged packets are processed by a predetermined application software which is executed by receiver 3, and are restored as the original data. A configuration in which the valid packets are arranged in a correct sequence based on the above described second communication pattern regardless of the packet sequence number is also possible.

Figure 4:
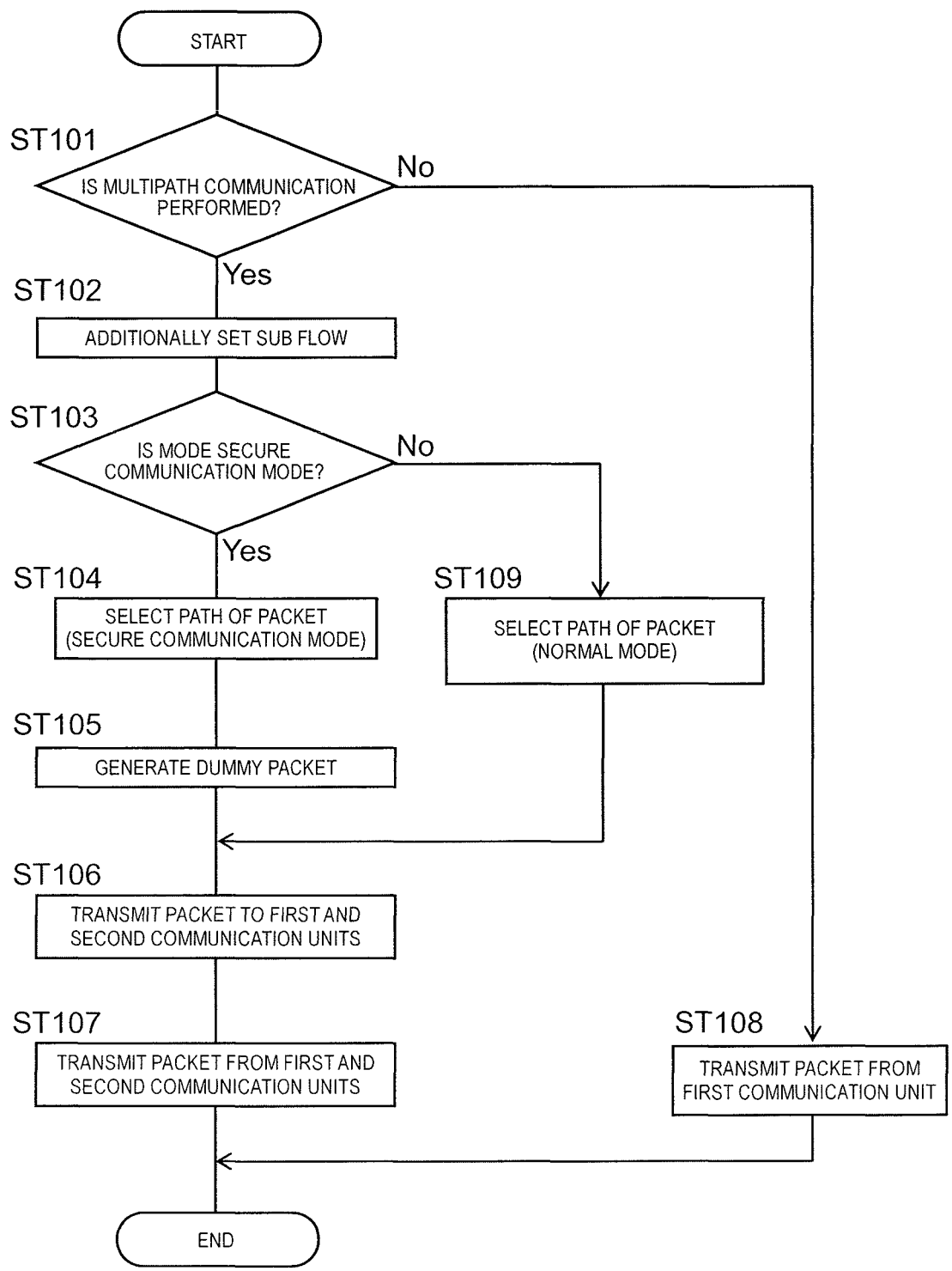
FIG. 4 is a flowchart illustrating an operation of a transmitter in the communication system.

FIG. 4 is a flowchart illustrating an operation of transmitter 2 in communication system 1. In a case where the packet is transmitted by transmitter 2, a predetermined communication control program is started, and negotiation of communication by one communication path (here, first communication unit 12) with receiver 3 is performed. Then, it is determined whether a multipath communication (communication by a plurality of communication paths) is necessary or not (ST101), and in a case where it is determined that the multipath communication is necessary (Yes), an additional setting of a sub flow used in a new communication path between the transmitter and receiver 3 is performed (ST102).

Here, in association with the determination in step ST101, it is possible for a user of transmitter 2 to set, in advance, whether or not to perform the multipath communication. In step ST102, a flow (sub flow 2) by second communication unit 13 (wireless LAN) is additionally set as a new TCP packet path, in addition to a flow (sub flow 1) by first communication unit 12 (LTE), according to the MPTCP, and a connection of the multipath by the negotiation with receiver 3 is established.

Next, it is determined whether the operation mode is the secure communication mode or not by transmitter 2 (ST103), and in a case where the secure communication mode is selected by a user (Yes), the selection of the transmission paths of each packet is performed according to the first communication pattern (ST104). Then, the dummy packets transmitted from one communication unit (for example, second communication unit 13) are sequentially generated correspondingly to the valid packets transmitted from the other communication unit (for example, first communication unit 12), respectively (ST105).

Next, in transmitter 2, each of the valid packets and the dummy packets which correspond to the valid packets respectively is sequentially transmitted to first communication unit 12 or second communication unit 13 which is a transmission source of each of the valid packets and dummy packets (ST106), and is sequentially transmitted to receiver 3 through first communication unit 12 or second communication unit 13 (ST107).

In step ST101, in a case where it is determined that the multipath communication is not necessary (No), the processes of steps ST102 to ST106 are omitted, and only the valid packets which do not include the dummy packet are sequentially transmitted to receiver 3 through first communication unit 12 (ST108). In step ST103, in a case where an operation mode other than the secure communication mode (here, the normal mode) is selected (No), the selection of the paths of each packet is performed according to a process sequence of the normal MPTCP (ST109). In step ST109, it is possible to select the paths of each packet so as to optimize (maximize) communication rate of the original data.

In the secure communication mode, steps ST104 to ST107 are performed in sequence or in parallel until the transmission of all valid packets is finished. A configuration in which the amount of data transmitted to receiver 3 is compared with a predetermined a threshold value and, regardless of presence or absence of demand of security, the secure communication mode is performed only in a case where the amount of data is less than the threshold value (Yes) may be used in step ST103. In this case, in a case where the amount of data is equal to or greater than the threshold value, the normal mode is performed.

In addition, a configuration in which contents of the first communication pattern (for example, a pattern indicating a sub flow for transmitting a valid packet) is to be used in step ST104 is set based on the negotiation performed between transmitter 2 (first processor 16) and receiver 3 is also possible. Further, a configuration in which the first communication pattern is transmitted to transmitter 2 by using a dedicated line from a management device which is not shown is also possible (the same manner is also applied to the second communication pattern).

Figure 5:
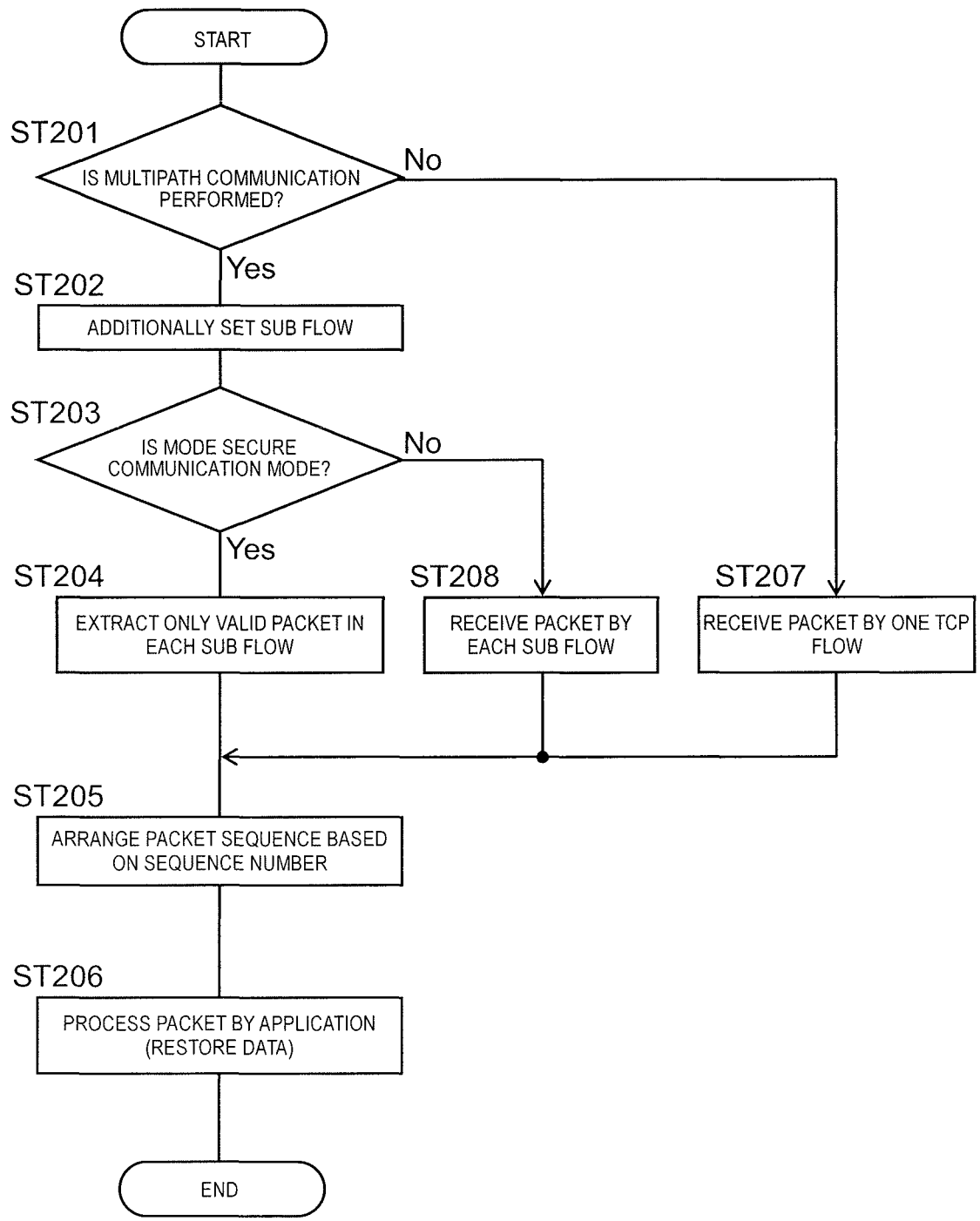
FIG. 5 is a flowchart illustrating an operation of a receiver in the communication system.

FIG. 5 is a flowchart illustrating an operation of receiver 3 in communication system 1. In a case where the packet is received by receiver 3, a predetermined communication control program is started, and negotiation of communication by one communication path (here, third communication unit 22) based on demand from transmitter 2 is performed. Then, in a case where receiver 3 determines that the multipath communication is necessary based on a result of the negotiation with transmitter 2 (ST201: Yes), an additional setting of a sub flow used in the TCP path between transmitter 2 and the receiver is performed (ST202). Here, the sub flow 2 by fourth communication unit 23 corresponding to second communication unit 13 is additionally set as a path of a new TCP packet, in addition to the sub flow 1 by third communication unit 22 corresponding to first communication unit 12, according to demand of transmitter 2.

Next, it is determined whether the operation mode of transmitter 2 is the secure communication mode or not by receiver 3 (ST203), and in a case of the secure communication mode (Yes), the dummy packet (indicated by a broken line in the lower portion of FIG. 3) is discarded and only the valid packet is extracted among the packets received by the sub flow 1 and the sub flow 2, according to the second communication pattern (ST204).

Then, the valid packet extracted in step ST204 is correctly and sequentially arranged (ST205) according to the packet sequence number (or sub flow sequence number), the arranged packets are processed by a predetermined application software which is executed by receiver 3, and are restored as the original data (ST206).

In step ST201, in a case where it is determined that the multipath communication is not necessary (No), the processes of steps ST202 to ST204 are omitted, and the packets (that is, only the valid packets which do not include the dummy packet) are sequentially received through third communication unit 22 by one TCP flow (ST207).

The received packets are arranged based on the packet sequence number (ST205), and then are restored as the original data (ST206).

In step ST203, in a case where it is determined that the operation mode other than the secure communication mode (here, the normal mode) is performed in transmitter 2 (No), the packets are received by the sub flow 1 (third communication unit 22) and the sub flow 2 (fourth communication unit 23), according to a process sequence of the MPTCP (ST208). The received packets are arranged based on the packet sequence number (ST205), and then are restored as the original data (ST206).

Although the present disclosure has been described based on specific exemplary embodiments, these exemplary embodiments are merely examples, and the present disclosure is not limited by these exemplary embodiment. For example, the plurality of communication paths used in the communication system according to the present disclosure are not limited to the LTE and the wireless LAN, and may adopt other known communication methods (3G and wired LAN). In addition, by the case of the communication path, a part of the plurality of communication paths may be used as a dedicated line. Each of the components of the communication system, the transmitter, the receiver, the communication method, the transmission method, and the reception method according to the present disclosure described above exemplary embodiments is not necessarily indispensable for the present disclosure, but may be omitted in a selective manner without departing from the spirit of the present disclosure.

INDUSTRIAL APPLICABILITY

The communication system, the transmitter, the receiver, the communication method, the transmission method, and the reception method according to the present disclosure can secure security by a simple configuration in a case where packet communication is performed by using a plurality of communication paths in a communication network, and are useful as a communication system, a transmitter, a receiver, a communication method, a transmission method, and a reception method used for transmitting necessary information in a network in which security securing is necessary, such as a public network.

REFERENCE MARKS IN THE DRAWINGS

1 COMMUNICATION SYSTEM
2 TRANSMITTER
3 RECEIVER
11 FIRST STORAGE UNIT
12 FIRST COMMUNICATION UNIT
13 SECOND COMMUNICATION UNIT
16 FIRST PROCESSOR
21 SECOND STORAGE UNIT
22 THIRD COMMUNICATION UNIT
23 FOURTH COMMUNICATION UNIT
26 SECOND PROCESSOR

The invention claimed is:
1. A communication system, comprising:
a transmitter and a receiver that perform communication of data, the data being divided into a plurality of valid packets, wherein the transmitter includes
    a first storage that stores a first communication pattern indicating which of a plurality of communication paths is to be used to transmit each of the valid packets,
    a first communication unit that performs communication with the receiver via a first one of the plurality of communication paths,
    a second communication unit that performs communication with the receiver via a second one of the plurality of communication paths, and
    a first processor that controls, according to the first communication pattern
        a first one of the first communication unit and the second communication unit to transmit a valid packet each time one of the valid packets is to be transmitted, and
        a second one of the first communication unit and the second communication unit to transmit a dummy packet at least one time when one of the valid packets is to be transmitted, the dummy packet being a packet that does not include valid data,
wherein the receiver includes
    a second storage that stores a second communication pattern indicating which of the plurality of communication paths is to be used to transmit each of the valid packets, the second communication pattern forming a pair with the first communication pattern,
    a third communication unit that receives at least one of the valid packet or the dummy packet transmitted from the first communication unit via the first one of the plurality of communication paths,
    a fourth communication unit that receives at least one of the valid packet or the dummy packet transmitted from the second communication unit via the second one of the plurality of communication paths, and
    a second processor that determines whether each of packets received by the third communication unit and the fourth communication unit is the valid packet or the dummy packet, according to matching between communication paths used for receiving each of the packets and the second communication pattern, and restores the data by arranging each of the packets that is received by the third communication unit and the fourth communication unit and determined to be the valid packet, and
wherein the second processor of the receiver determines whether each of the packets received by the third communication unit and the fourth communication unit is the valid packet or the dummy packet without using information in each packet.

2. The communication system of claim 1,
wherein the first processor selects the first one of the first communication unit and the second communication unit to transmit the valid packet according to the first communication pattern, and controls the second one of the first communication unit and the second communication unit to transmit the dummy packet corresponding to the valid packet.

3. The communication system of claim 1,
wherein the first processor sets the first communication pattern stored in the first storage based on a negotiation performed between the first processor and the receiver, and
the second processor sets the second communication pattern stored in the second storage based on the negotiation.

4. The communication system of claim 1,
wherein the dummy packet includes random data instead of data included in the valid packet.

5. The communication system of claim 1,
wherein the transmitter is configured to perform a normal mode in which the dummy packet is not inserted into the valid packets and a secure communication mode in which the dummy packet is inserted into the valid packets, and
the first processor performs the secure communication mode only in a case where an amount of data transmitted to the receiver is less than a predetermined threshold value.

6. The communication system of claim 1,
wherein the first processor selects, according to the first communication pattern, the first one of the first communication unit and the second communication unit to transmit the valid packet each time one of the valid packets is to be transmitted.

7. The communication system of claim 1,
wherein a sequence number assigned to the valid packet is assigned to the dummy packet.

8. The communication system of claim 7,
wherein the sequence number indicates a transmission sequence in each of the first communication unit and the second communication unit.

9. The communication system of claim 8,
wherein the first communication unit and the second communication unit substantially simultaneously transmit the valid packet and the dummy packet to which the sequence number is assigned.

10. The communication system of claim 7,
wherein the valid packet is obtained by dividing data transmitted in one session, and
the sequence number indicates a sequence of the valid packet configuring the data transmitted in the one session.

11. The communication system of claim 7,
wherein the sequence number indicates a sequence in which the valid packets are arranged in a case where the original data is restored.

12. The communication system of claim 1,
wherein a packet sequence number is assigned to each of the valid packets, and
the packets, which are received by at least one of the third communication unit and the fourth communication unit and determined to each be the valid packet, are received out-of-sequence.

13. The communication system of claim 1,
wherein the valid packets are assigned packet sequence numbers, and
the second processor restores the data by arranging each of the packets, which is received by the third communication unit and the fourth communication unit and determined to be the valid packet, according to the packet sequence numbers.

14. The communication system of claim 13,
wherein the receiver receives the valid packets, which are assigned the packet sequence numbers, out-of-sequence.

15. The communication system of claim 1,
wherein the valid packets are assigned packet sequence numbers, and
the second processor restores the data by arranging each of the packets that is received by the third communication unit and the fourth communication unit and determined to be the valid packet regardless of the packet sequence numbers.

16. The communication system of claim 1, wherein the valid packet and the dummy packet are simultaneously transmitted by the first one of the first communication unit and the second communication unit and the second one of the first communication unit and the second communication unit.

17. A transmitter performing communication with a receiver, the transmitter comprising:
- a first storage that stores a first communication pattern indicating which of a plurality of communication paths is to be used to transmit each of the valid packets;
- a first communication unit that performs communication with the receiver via a first one of the plurality of communication paths;
- a second communication unit that performs communication with the receiver via a second one of the plurality of communication paths; and
- a first processor that controls, according to the first communication pattern
  - a first one of the first communication unit and the second communication unit to transmit a valid packet each time one of the valid packets is to be transmitted, and
  - a second one of the first communication unit and the second communication unit to transmit a dummy packet at least one time when one of the valid packets is to be transmitted, the dummy packet being a packet that does not include valid data wherein the first processor performs a negotiation with the receiver to set, in the receiver, a second communication pattern indicating which of the plurality of communication paths is to be used to transmit each of the valid packets, the second communication pattern forming a pair with the first communication pattern, and the receiver determines whether each of the packets received from the first communication unit and the second communication unit is the valid packet or the dummy packet without using information in each packet.

18. A receiver performing communication with a transmitter, the transmitter storing a first communication pattern indicating which of a plurality of communication paths is to be used to transmit each of valid packets, the receiver comprising:
- a second storage that stores a second communication pattern indicating which of the plurality of communication paths is to be used to transmit each of the valid packets, the second communication pattern forming a pair with the first communication pattern;
- a third communication unit that receives at least one of a valid packet or a dummy packet transmitted from a first communication unit via a first one of a plurality of communication paths, the valid packet being included in data divided into a plurality of valid packets, the dummy packet being a packet that does not include valid data;
- a fourth communication unit that receives at least one of the valid packet or the dummy packet transmitted from a second communication unit via a second one of the plurality of communication paths; and
- a second processor that determines whether each of packets received by the third communication unit and the fourth communication unit is the valid packet or the dummy packet, according to matching between communication paths used for receiving each of the packets and the second communication pattern, and restores the data by arranging each of the packets that is received by the third communication unit and the fourth communication unit and determined to be the valid packet wherein the second processor determines whether each of the packets received by the third communication unit and the fourth communication unit is the valid packet or the dummy packet without using information in each packet.

\* \* \* \* \*